(12) United States Patent
Chen

(10) Patent No.: US 11,892,236 B2
(45) Date of Patent: Feb. 6, 2024

(54) SYSTEM FOR CONDITIONING STUCCO IN A DUST COLLECTOR

(71) Applicant: Schenck Process LLC, Kansas City, MO (US)

(72) Inventor: Michael M. Chen, Naperville, IL (US)

(73) Assignee: Schenck Process LLC, Kansas City, MO (US)

(*) Notice: Subject to any disclaimer, the term of this patent is extended or adjusted under 35 U.S.C. 154(b) by 738 days.

(21) Appl. No.: 17/038,910

(22) Filed: Sep. 30, 2020

(65) Prior Publication Data

US 2022/0099372 A1 Mar. 31, 2022

(51) Int. Cl.
| | |
|---|---|
| *F27B 1/00* | (2006.01) |
| *B01J 6/00* | (2006.01) |
| *B01D 46/02* | (2006.01) |
| *B01D 46/48* | (2006.01) |
| *C04B 11/036* | (2006.01) |
| *F27B 1/08* | (2006.01) |

(Continued)

(52) U.S. Cl.
CPC ............ *F27B 1/005* (2013.01); *B01D 46/023* (2013.01); *B01D 46/48* (2013.01); *B01J 6/004* (2013.01); *C04B 11/036* (2013.01); *F27B 1/08* (2013.01); *F27B 1/21* (2013.01); *F27B 1/26* (2013.01); *F27B 1/28* (2013.01); *F27D 1/0003* (2013.01); *F27D 3/08* (2013.01); *F27D 15/02* (2013.01); *F27D 2003/0038* (2013.01); *F27D 2003/0046* (2013.01); *F27D 2003/0083* (2013.01); *F27D 2019/0071* (2013.01)

(58) Field of Classification Search
CPC .... B01J 6/00; B01J 6/001; B01J 6/004; F27D 3/08; F27D 1/005; F27D 1/08; F27D 1/21; F27D 1/26; F27D 1/28; F27D 2003/0038; F27D 2003/0037; F27D 2003/0083; B01D 46/023; B01D 46/48
See application file for complete search history.

(56) References Cited

U.S. PATENT DOCUMENTS

| | | | |
|---|---|---|---|
| 1,630,605 A * | 5/1927 | Butler | B65D 88/26 222/129 |
| 1,746,294 A * | 2/1930 | Tyler | C04B 11/032 423/172 |

(Continued)

FOREIGN PATENT DOCUMENTS

| | | |
|---|---|---|
| CA | 2555676 A1 | 10/2005 |
| CN | 107866121 A * | 4/2018 |

OTHER PUBLICATIONS

Machine Translation of CN 107866121 A (Year: 2018).*

(Continued)

*Primary Examiner* — Lessanework Seifu
(74) *Attorney, Agent, or Firm* — Robinson & Cole LLP

(57) ABSTRACT

A system for conditioning stucco particulate material includes a vessel having separation chamber in communication with a holding chamber having a holding volume therein. The conditioning system includes the holding volume sufficient to condition the stucco particulate material therein and/or a control system configured to delay discharge of the stucco particulate material from the holding chamber. The system for conditioning stucco particulate material is configured to increase residence time of the stucco particulate material in the holding chamber to promote calcining conditioning therein.

13 Claims, 9 Drawing Sheets

(51) Int. Cl.
*F27B 1/21* (2006.01)
*F27B 1/26* (2006.01)
*F27B 1/28* (2006.01)
*F27D 1/00* (2006.01)
*F27D 3/08* (2006.01)
*F27D 15/02* (2006.01)
*F27D 3/00* (2006.01)
*F27D 19/00* (2006.01)

(56) References Cited

U.S. PATENT DOCUMENTS

| | | | | |
|---|---|---|---|---|
| 2,404,884 | A * | 7/1946 | Pieper | B65G 33/00 414/218 |
| 3,071,297 | A * | 1/1963 | Lee | B65D 88/28 193/34 |
| 10,087,004 | B2 * | 10/2018 | Gill | B65G 11/02 |
| 10,556,806 | B2 | 2/2020 | Gocke et al. | |
| 2005/0190645 | A1 * | 9/2005 | Bolind | B01F 35/93 366/276 |
| 2011/0150750 | A1 * | 6/2011 | Goecke | C04B 11/0283 423/555 |

OTHER PUBLICATIONS

PCT International Search Report and Written Opinion issued in corresponding PCT Application No. PCT/2021/051877, dated Feb. 2, 2022, pp. 1-12.

\* cited by examiner

SYSTEM FOR CONDITIONING STUCCO IN A DUST COLLECTOR

TECHNICAL FIELD

The present invention is directed to a system for conditioning stucco particulate material in a dust collector by increasing the residence time of the stucco particulate material in the dust collector holding chamber where sufficient agitation is employed to homogenize the stucco phases, i.e., finish calcining any residual gypsum (dihydrate, $CaSO_4$ 2 $H_2O$) and convert any over-calcined stucco (soluble anhydrite, $CaSO_4$) to desired hemihydrate ($CaSO_4$ ½ $H_2O$). The present invention is further directed to use of an existing or oversized holding chamber to increase the residence time of the stucco particulate material therein. The present invention is also directed to a level control system configured to increase the residence time of the stucco particulate material in the holding chamber.

BACKGROUND

Grinding mills are used to crush and pulverize solid materials such as minerals, limestone, gypsum that is used in the production of stucco, phosphate rock, salt, biomass, coke and coal into small particles. Impact hammer mill and ball race mills are typical grinding mills that can be used to crush, pulverize, drying and flash calcining certain kind of solid materials such as gypsum all in one step. The flash calcining process only provide material very short time period (i.e., seconds) for calcination, as a result, a small percentage of particles can still be un-calcined, while some over-calcined due to high temperatures. Therefore, it is important to have an additional post calcination process with longer residence time at lower temperatures to further condition/homogenize the calcined gypsum, i.e., stucco.

A prior art stucco production system 1000 for generating stucco using a hammer impact mill 100 is illustrated in FIG. 1. The stucco production system 1000 includes a silo 200 for storing raw gypsum therein. A motor operated plow discharger 210 is arranged to a bottom outlet portion of the silo 200 for extracting the raw gypsum from the silo 200 and conveying the raw gypsum to a weight belt feeder 220. A measured quantity of the raw gypsum is transported to an inlet hopper 110 of the hammer impact mill 100 via conduit 230. The hammer impact mill 100 includes a motor operated hammer impact assembly 130 the pulverizes the raw gypsum supplied thereto. An air supply system 300 that includes a blower 310 and air preheater 320 provides heated air to the hammer impact assembly 130. The blower 310 forces the heated air through the hammer impact mill 100, flash calcines the pulverized gypsum into calcined stucco particulate material and entrains the calcined stucco particulate material for transport to a classifier 140. The classifier 140 returns coarse particles back to the hopper 110 for further grinding and calcining. The fine particles of the calcined stucco particulate material exit the classifier 140 at about 325 degrees Fahrenheit. The calcined particulate material is transported to a dust collector (e.g., a bag house or electrostatic precipitator) 500 that separates the calcined particulate material from the heated air. The cleaned hot air is discharged from the dust collector 500 at about 325 degrees Fahrenheit into a discharge system 600 that includes fan 610 and stack system 620. The dust collector 500 separates the stucco particulate material from the hot air. For example, the stucco particulate material collects on the outside surface of porous bags and the gas flows through the bags into the discharge system 600. The stucco particulate material accumulated on the bags is periodically removed by agitation such as a pulse of air or a vibratory action. The stucco particulate material drops by the force of gravity into a trough portion of the dust collector 500. The trough is located on the bottom of the dust collector 500. Typically, the stucco accumulated in the trough area is being discharged quickly (e.g., several seconds to a few minutes) of flow of the stucco particulate material into the dust collector 500. The stucco particulate material is discharged into a cooler 700 (e.g., a rotary cooler), before the trough fills up. The cooler 700 reduces the temperature of the stucco particulate material. After cooling, the stucco particulate material is transported to a storage vessel 800.

However, flash calcined stucco discharged from the hammer impact mill 100 and held in the dust collector 500 for a short residence time (e.g., several seconds to a few minutes) does not always have the correct phase composition. Thus, additional conditioning in a separate vessel such as a cooler is typically required to improve stucco quality. However, the separate vessel like the cooler is typically at a lower temperature which results in it taking a longer time period for the residual raw gypsum to completely calcine or never get fully calcined due to the limitation of temperature and residence time.

Thus, there is a need for conditioning the stucco at a high enough temperature for complete conditioning without the use of additional vessels.

SUMMARY

There is disclosed herein a system for conditioning stucco particulate material in a dust collector such as a bag house or an electrostatic precipitator. The system includes a vessel that has a separation chamber in communication with a holding chamber (e.g., a collection trough). The separation chamber has an inlet for supplying the stucco particulate material entrained in a gas such as heated air. The separation chamber has a collector system (e.g., a bag separator system) configured for separating the stucco particulate material from the gas by allowing the gas to pass through and separating out the stucco particulate material. The separation chamber has a gas outlet for discharging the gas from the separation chamber. The collector system has a discharge capacity (e.g., measured in tons per hour) for discharging the stucco particulate material therefrom and into the holding chamber. The holding chamber defines a holding volume therein. The holding chamber has a stucco outlet and a conveyor disposed between the holding volume and the stucco outlet for conveying the stucco particulate material through the stucco outlet. The system includes an embodiment (referred to herein as the increased holding chamber volume embodiment) wherein the holding volume is of a predetermined magnitude sufficient to condition the stucco particulate material in the holding chamber, before being discharged through the stucco outlet. In some embodiments, the predetermined magnitude of the holding volume is configured to accumulate and retain the stucco material in the holding chamber for 20 to 30 minutes of calcining before being discharged from the stucco outlet. In the increased holding chamber volume embodiment, a support structure engages the holding chamber to support the increased weight of the holding chamber and the increased weight of the stucco particulate material accumulated and retained therein.

The system also includes another embodiment wherein a control system is provided with a control unit in communication with a drive unit that is connected to the conveyor. The control system includes a sensor (e.g., a level sensor or level switch) that is in communication with the holding chamber and the control unit. The sensor is configured to generate control signals at a setpoint and to transmit the control signals to the control unit. The control unit is configured to control the drive unit based upon the control signals, to accumulate and retain a residual head of the stucco particulate material in the holding chamber for conditioning, before being discharged through the stucco outlet. In some embodiments, the holding chamber has a maximum capacity level and the sensor is a level sensor such as a level switch. The setpoint is set at the maximum capacity level and the control unit reduces speed of the drive unit to reduce output of the conveyor, until the maximum capacity level is reached. The control unit maintains a minimum speed to prevent bridging or caking of the stucco particulate material, until the maximum capacity level is reached. After the maximum capacity level is reached the control unit resets the speed of the drive unit to increase the output of the conveyor to normal operating capacity to match the discharge capacity of the collector system.

In some embodiments, the conditioning includes complete calcining of the stucco particulate material in the holding chamber. In some embodiments, there is only partial conditioning of the stucco particulate material in the holding chamber.

In some embodiments, the system includes a stucco cooler (or other heat exchanger) positioned downstream of and in communication with the stucco outlet. When only partial conditioning is performed in the holding chamber, conditioning is completed in the stucco cooler. In some embodiments, the stucco cooler includes a moisture inlet line that is in fluid communication with a moisture supply for conveying moisture to the stucco cooler.

In some embodiments, the vessel includes a heater and/or insulation to prevent condensation in the vessel.

In some embodiments, the holding chamber includes one or more agitators for mixing and mitigating bridging of the stucco particulate material in the holding chamber. The agitators include one or more of a vibrator arrangement, a gas distribution arrangement and a configuration on a flight of a screw portion of the conveyor.

In some embodiments, the holding chamber includes a sloped wall that has an inwardly facing surface that slopes downwardly from a top portion thereof at an angle of a minimum of 60 degrees (preferably 70 degrees) measured from a horizontal reference line at the top portion to the inwardly facing surface.

In some embodiments, the holding chamber includes a liner arrangement therein and which is made from a low friction material, such as but not limited to polytetrafluoroethylene.

In some embodiments, the conveyor includes a screw that has a first end and a second end. The second end is located proximate the stucco outlet. The screw has at least a first pitch and a second pitch. The second pitch is located along a length of the screw proximate the second end. The second pitch is greater than the first pitch.

DETAILED DESCRIPTION

Figure 2A:
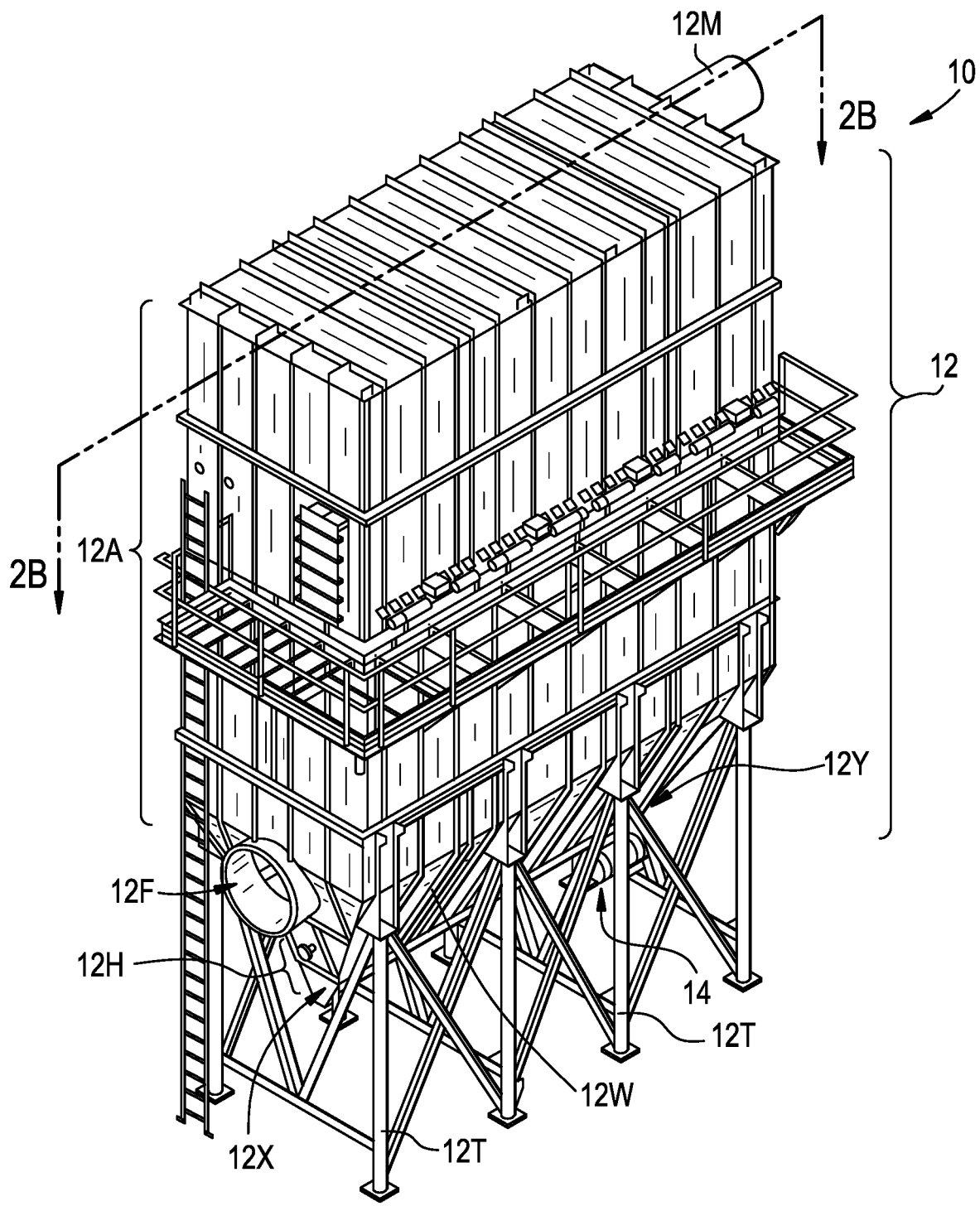
FIG. 2A is a perspective view of conditioning system for stucco particulate material of the present invention.
Figure 2B:
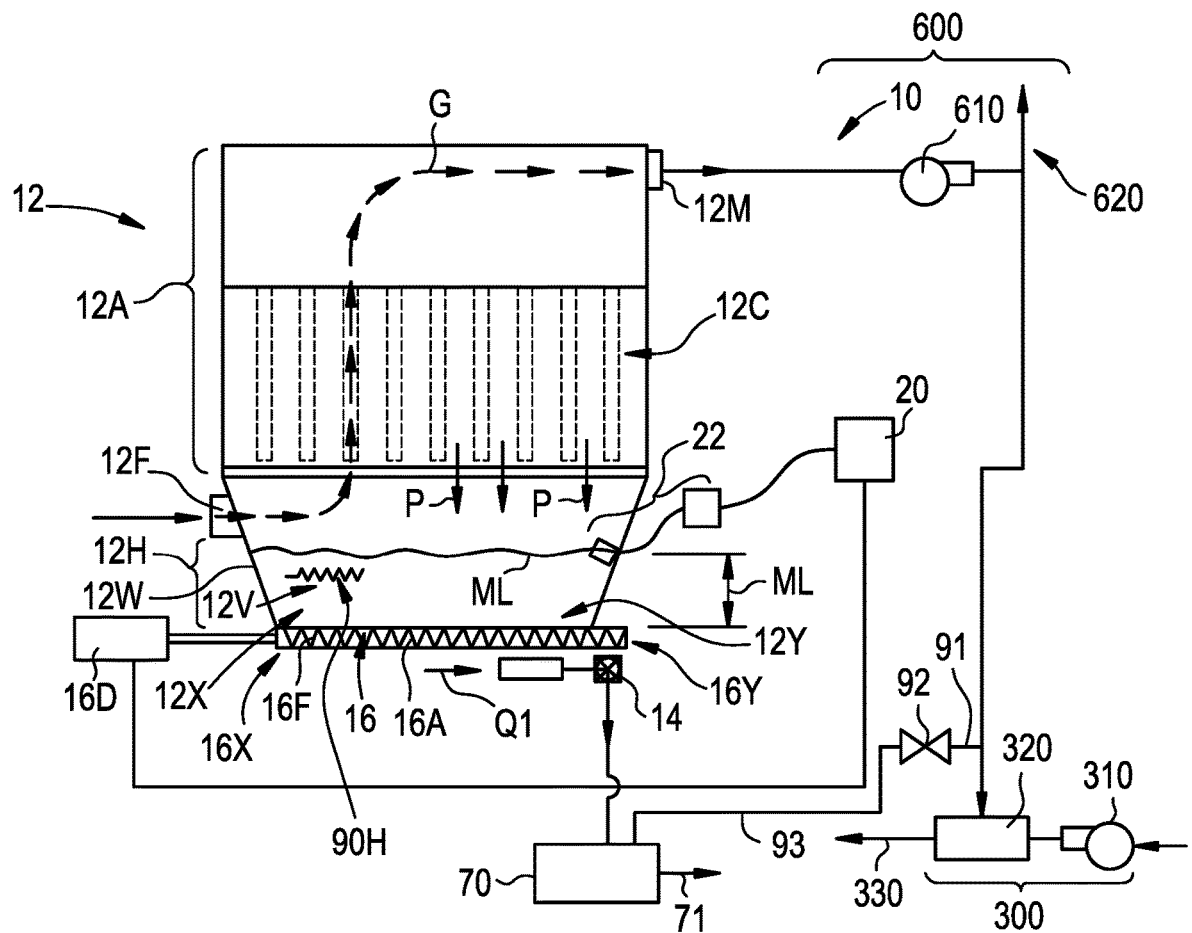
FIG. 2B is a cross sectional schematic illustration of a conditioning system for stucco particulate material of the present invention taken across section 2B-2B of FIG. 2A.
Figure 2C:
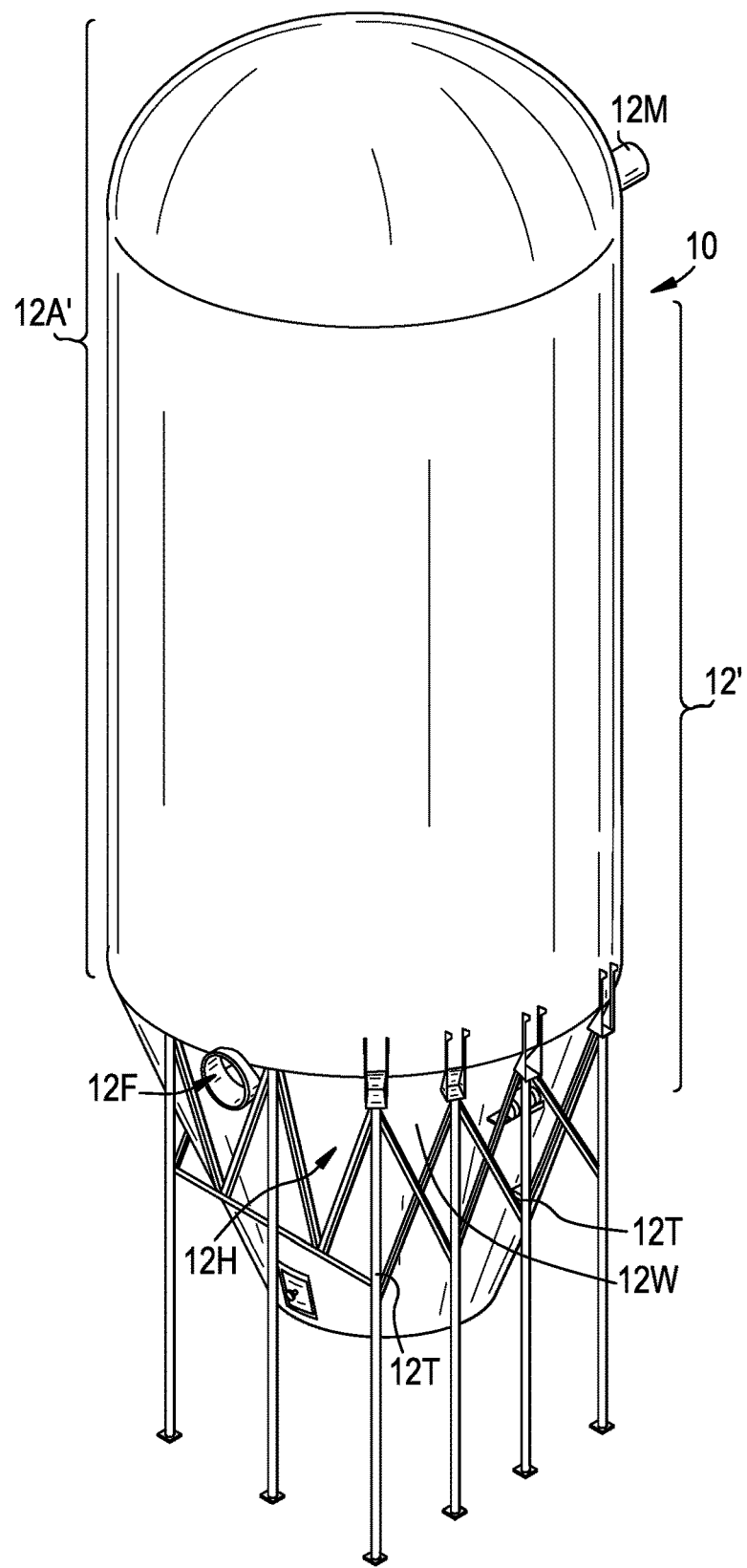
FIG. 2C is a perspective view of another embodiment of the conditioning system for stucco particulate material of the present invention and having a conical holding chamber with a centrally located stucco outlet.

As shown in FIGS. 2A and 2B, a conditioning system for stucco particulate material is generally designated by the numeral 10 and includes a vessel 12 having separation chamber 12A in communication with a holding chamber 12H. The holding chamber 12H extends laterally between a first end 12X and a second end 12Y. The vessel 12 is secured to a foundation via a support structure 12T. The separation chamber 12A has a generally rectangular cross section and the holding chamber 12H has as a generally rectangular cross section with sloped side walls 12W (e.g., four sloped side walls). While FIG. 12A illustrates the separation chamber 12A and the holding chamber 12H having the generally rectangular cross section, the present invention is not limited in this regard, as other configurations may be employed including but not limited to a vessel 12' having a separation chamber 12A' that has a round/cylindrical cross section and a holding chamber 12H' that has a conical shape and a centrally located stucco outlet 14, as illustrated in FIG. 2C. the holding chamber 12H' has sloped walls 12W' that slopes downwardly from a top portion (i.e., at horizontal reference line H) thereof at an angle θ of a minimum of 60 degrees measured from the horizontal reference line H (i.e., located at the top portion of the sloped wall 12W') to the inwardly facing surface 12Q. In one embodiment, the angle θ is about 70 degrees, similar to that shown in FIG. 3.

The conditioning system 10 increases the residence time of the stucco particulate material in the holding chamber 12H where sufficient agitation is employed to homogenize and condition the stucco phases, i.e., finish calcining any residual gypsum (dihydrate, $CaSO_4 \cdot 2\,H_2O$) and convert over calcined stucco (soluble anhydrite, $CaSO_4$) to desired hemihydrate ($CaSO_4 \cdot ½\,H_2O$). In some embodiments, heat can be added to the holding chamber 12H to homogenize and condition the stucco phases, i.e., finish calcining any residual gypsum (dihydrate, $CaSO_4 \cdot 2\,H_2O$) to desired hemihydrate ($CaSO_4 \cdot ½\,H_2O$). For example, in one embodiment, an additional heater 90H is positioned in the holding chamber 12H to add heat (above the amount of heat required to prevent condensation) to the stucco particulate material to assist in conditioning thereof, as shown in FIG. 2B.

Figure 1:
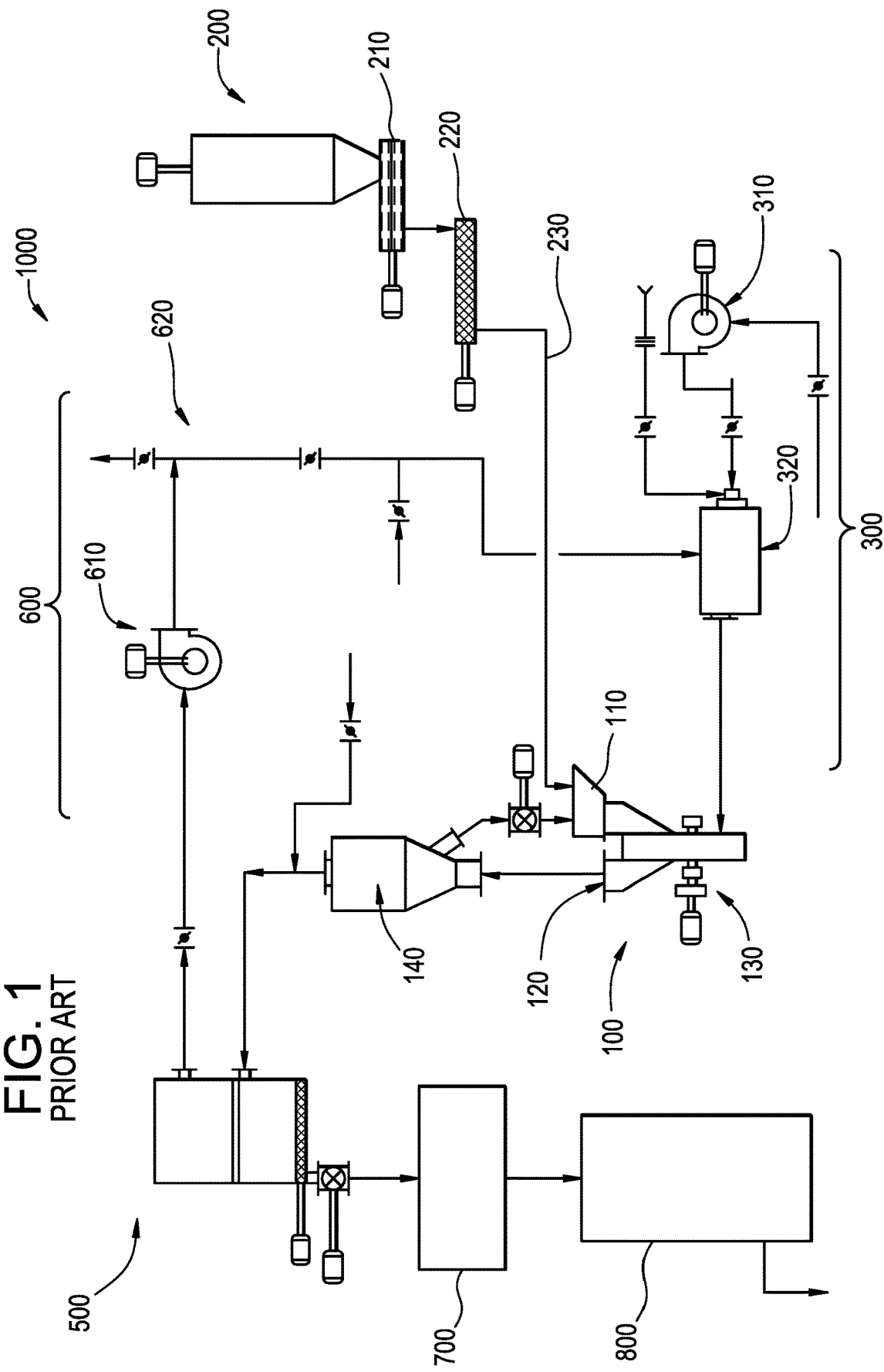
FIG. 1 is a schematic flow diagram of a prior art stucco production system.

The separation chamber 12A has an inlet 12F for supplying the stucco particulate material entrained in a hot gas, for example, hot air at 325 degrees Fahrenheit from a mill such as the hammer impact mill 100 shown, for example, in FIG. 1. The holding chamber 12H is immediately below the inlet 12F. As shown in FIG. 2B, the separation chamber 12A has a collector system 12C (e.g., a filter bag system or an electrostatic precipitator) configured for separating the stucco particulate material from the gas. The separation chamber 12A has an outlet 12M for discharging clean gas (e.g., air) therefrom and into a discharge system 600 as shown, for example, in FIG. 1. As shown in FIG. 2B, the separation chamber 12C has a gas outlet for discharging the gas from the separation chamber 12A. The stucco particulate material entrained in the gas flows into the separation chamber 12A via the inlet 12F and the gas flows through the collector system 12C (e.g., through the filter bags) in the direction of the arrow G and is discharged from the separation chamber 12A via the outlet 12M. The stucco particulate material collects in the collector system 12C (e.g., on the outside of the filter bags) and is released (e.g., discharged) from the collector system 12C (e.g., via air pulses or vibration) and drops by the force of gravity into the holding chamber 12H. The collector system 12C has a discharge capacity (e.g., a production capacity measured in pounds per hour) for discharging the stucco particulate material therefrom and into the holding chamber 12H.

The holding chamber 12H defines a holding volume 12V therein. The holding chamber 12H has a stucco outlet 14 and a conveyor 16 disposed between the holding volume 12V and the stucco outlet 14 for conveying the stucco particulate material through the stucco outlet 14.

The conditioning system 10 includes one or both of two embodiments for conditioning of the stucco particulate material (i.e., embodiment (a) and embodiment (b)) each of which are directed to increasing the residence time of the stucco particulate material in the holding chamber 12H to promote conditioning (e.g., calcining) therein. In embodiment (a) the residence time of the stucco material in the holding chamber 12H is increased by employing an existing holding chamber 12H with a holding volume 12V of a sufficient magnitude to allow for the increased residence time in the holding chamber 12H or initially sizing or increasing the volume of the holding chamber 12H to create a holding volume 12V of a sufficient magnitude to allow for the increased residence time in the holding chamber 12H. For example, embodiment (a) includes the holding volume 12V being of a predetermined magnitude sufficient to condition (e.g., completely calcine) the stucco particulate material in the holding chamber 12H, before being discharged through the stucco outlet 14. In embodiment (b) the residence time of the stucco particulate material in the holding chamber 12H is increased by a control system that delays discharge of the stucco particulate material until a sufficient head of the stucco particulate material is accumulated in the holding chamber 12H. For example, embodiment (b) includes a control system that includes a control unit 20 in communication with a drive unit 16H connected to the conveyor 16, a sensor 22 in communication with the holding chamber 12H and the control unit 20, the sensor 22 is configured to generate control signals at a setpoint and transmitting the control signals to the control unit 20, the control unit 20 is configured to control the drive unit 16D based upon the control signals, to accumulate and retain the stucco particulate material in the holding chamber 12H for conditioning, before being discharged through the stucco outlet 14. Embodiment (a) and embodiment (b) can be employed alone or together. In one embodiment, the control system of embodiment (b) is employed with a preexisting holding chamber having a preexisting volume, to obtain a resident time sufficient to homogenize and condition the stucco phases, i.e., finish calcining any residual gypsum (dihydrate, $CaSO_4$ 2 $H_2O$) and convert over calcined stucco (soluble anhydrite, $CaSO_4$) to desired hemihydrate ($CaSO_4$ ½ $H_2O$).

As shown in FIG. 2B, the holding chamber 12H has a maximum capacity level ML. In one embodiment, the sensor 22 is a level sensor or level switch. The setpoint is set at the maximum capacity level ML and during startup of the system 10, the control unit 20 reduces speed of the drive unit 16D to reduce output of the conveyor 16, until the maximum capacity level ML is reached thereby allowing a residual head of the stucco particulate material to build up in the holding chamber 12H. During startup, when the holding chamber 12H is being filled to the maximum capacity level ML, the control unit maintains the drive unit 16D at minimum speed to prevent bridging or caking of the stucco particulate material. The control system is configured to cause stucco particulate material to accumulate in the holding chamber 12H for a dwell time for either partial or complete conditioning. When the maximum capacity level ML is achieved, the level sensor 22 recognizes the level and sends a signal to the control unit 20 which in turn sends a control signal to the drive unit 16D to resume normal capacity speed (e.g., full speed) of the conveyor 16 to match the discharge capacity of the collector system 12C and maintain a constant level in the holding chamber 12H. At normal capacity speed, the conveyor 16 transports the stucco particulate material through the stucco outlet 14 on a first-in/first-out basis. In one embodiment, the conveyor 16 employs a variable pitch screw conveyor to achieve the first-in/first-out flow configuration as shown and described herein with regard to FIGS. 7A and 7B. Thus, the stucco particulate material that enters the holding chamber 12H remains in the holding chamber 12H for a proper dwell time (e.g., 20 to 30 minutes) for conditioning, before being discharged from the holding chamber. At the normal capacity speed, the conveyor 16 transports the stucco particulate material through the stucco outlet 14 at a rate that allows all additional stucco particulate material supplied to the holding chamber 12H to remain in the holding chamber 12H for the proper dwell time for conditioning.

As used herein, the term conditioning of the stucco particulate material includes maintaining the stucco particulate material that requires additional conditioning (i.e., pulverized raw gypsum) at or above 300 degree Fahrenheit to calcine the residual raw material by releasing water vapor which converts the dihydrate ($CaSO_4$ 2$H_2O$) to hemihydrate ($CaSO_4$ ½ $H_2O$). The water vapor in the holding chamber 12H thus converts soluble anhydrite ($CaSO_4$) to hemihydrate ($CaSO_4$ ½ $H_2O$).

In one embodiment, the holding volume 12V of the holding chamber 12H is of a predetermined magnitude sufficient to accumulate a head of the stucco particulate material for a dwell time sufficient to complete calcining in the holding chamber 12H, before being discharged through the stucco outlet 14. In one embodiment, the predetermined magnitude of the holding volume 12V is configured to accumulate and retain the stucco material in the holding chamber for 20 to 30 minutes of calcining before being discharged from the stucco outlet 14. For example, for a 20 ton per hour production capacity, the holding volume 12V for complete conditioning of the stucco particulate material is 6.7 to 10 tons. The holding chamber 12H that is of a predetermined magnitude sufficient to accumulate enough of the stucco particulate material so as to conditioning the stucco particulate material until calcining is completed in the holding chamber 12H is larger and heavier (i.e., including the weight of the holding chamber 12H and the stucco material therein) than holding chambers 12H that can only partially calcine the stucco particulate material. Therefore, the holding chamber 12H that is of a magnitude to accumulate a head of the stucco particulate material for a dwell time sufficient to complete conditioning, requires a supplementary support structure engaging the holding chamber 12H to support the weight of the holding chamber 12H and stucco particulate material accumulated and retained therein.

In the embodiment wherein the holding volume 12V is of a magnitude sufficient to accumulate enough of the stucco particulate material to have more complete conditioning in the holding chamber 12H, the stucco cooler 70 (shown in FIG. 2B downstream of the stucco outlet 14) is not configured for further calcining effectively and merely cools the stucco particulate material.

In one embodiment a fraction of the stucco particulate material that is discharged through the stucco outlet may have been over calcined resulting in some anhydrite, $CaSO_4$. As shown in FIG. 2B, moisture (e.g., water vapor) is added to the cooler 70 to transform the anhydrite, $CaSO_4$ to desired hemihydrate ($CaSO_4$ ½ $H_2O$) a second part of the conditioning is still effective by adding water vapor into the stucco to convert over-calcined stucco to hemihydrate-ideal stucco. The combination of the conditioning in the dust collector 12A and the stucco cooler 70 will complete the conditioning process, by complimenting each other. In one embodiment, the stucco cooler is a rotating cooler that enables exposing the surface of the stucco particulate material to water vapor in the stucco cooler (e.g., preexisting water vapor or added water vapor through recirculation of small amount of exhaust gas from the impact mill or outlet 12M from the separation chamber 12A) throughout the cooler process, which in some embodiments has a residence time of about 20 minutes. The stucco cooler 70 is a rotary cooler that tumbles the stucco particulate material in the cooler 70 which helps expose stucco particles to the moisture (e.g., water vapor). For example, FIG. 2B illustrates that the cleaned hot moist air is discharged from the separation chamber 12A via the outlet 12M at about 325 degrees Fahrenheit into a discharge system 600 that includes fan 610 and stack system 620. A portion of the cleaned hot moist air is transported to an air supply system 300 that includes a blower 310 and air preheater 320 which provides heated air to the hammer impact assembly 130 (see FIG. 1). Referring to FIG. 2B, a moisture supply is in fluid communication with the stucco cooler 70. The moisture supply is provided by diverting a portion of the cleaned hot moist air from the discharge system 600 to the stucco cooler 70 via a transport line 91, a valve 92 and a moisture inlet line 93. The valve 92 is located between the transport line 91 and the moisture inlet line 93. The moisture inlet line 93 is in fluid communication with the stucco cooler 70 to convey moisture to the stucco cooler 70 to complete the conditioning (e.g., transform the anhydrite, $CaSO_4$ to desired hemihydrate ($CaSO_4$ ½ $H_2O$)). The stucco cooler 70 includes a discharge line 71 for discharging the stucco particulate material therefrom.

In one embodiment, the holding volume 12V is of a magnitude sufficient to hold the stucco particulate material only long enough to partially calcine the stucco particulate material in the holding chamber 12H before the holding chamber 12H is full (i.e., reaches the maximum capacity level ML). Thus, discharge of the stucco particulate material from the holding chamber 12H through the stucco outlet 14 must resume at full capacity to prevent the incoming stucco particulate material from overfilling of the holding chamber 12H. In some embodiments wherein the holding volume 12H is too small to have sufficient residence time for the stucco particulate material to become completely calcined, further calcining can be accomplished in auxiliary equipment located downstream of the conditioning system 10. For example, in one embodiment, the additional conditioning of the stucco particulate material is accomplished in a stucco cooler 70 (see FIG. 2B) positioned downstream of and in communication with the stucco outlet 14. In the embodiment wherein the stucco particulate material is only partially conditioned in the conditioning system 10, the stucco cooler 70 (or other heat exchanger) is configured to complete the conditioning and cool the stucco particulate material and to recover heat.

Figure 3:
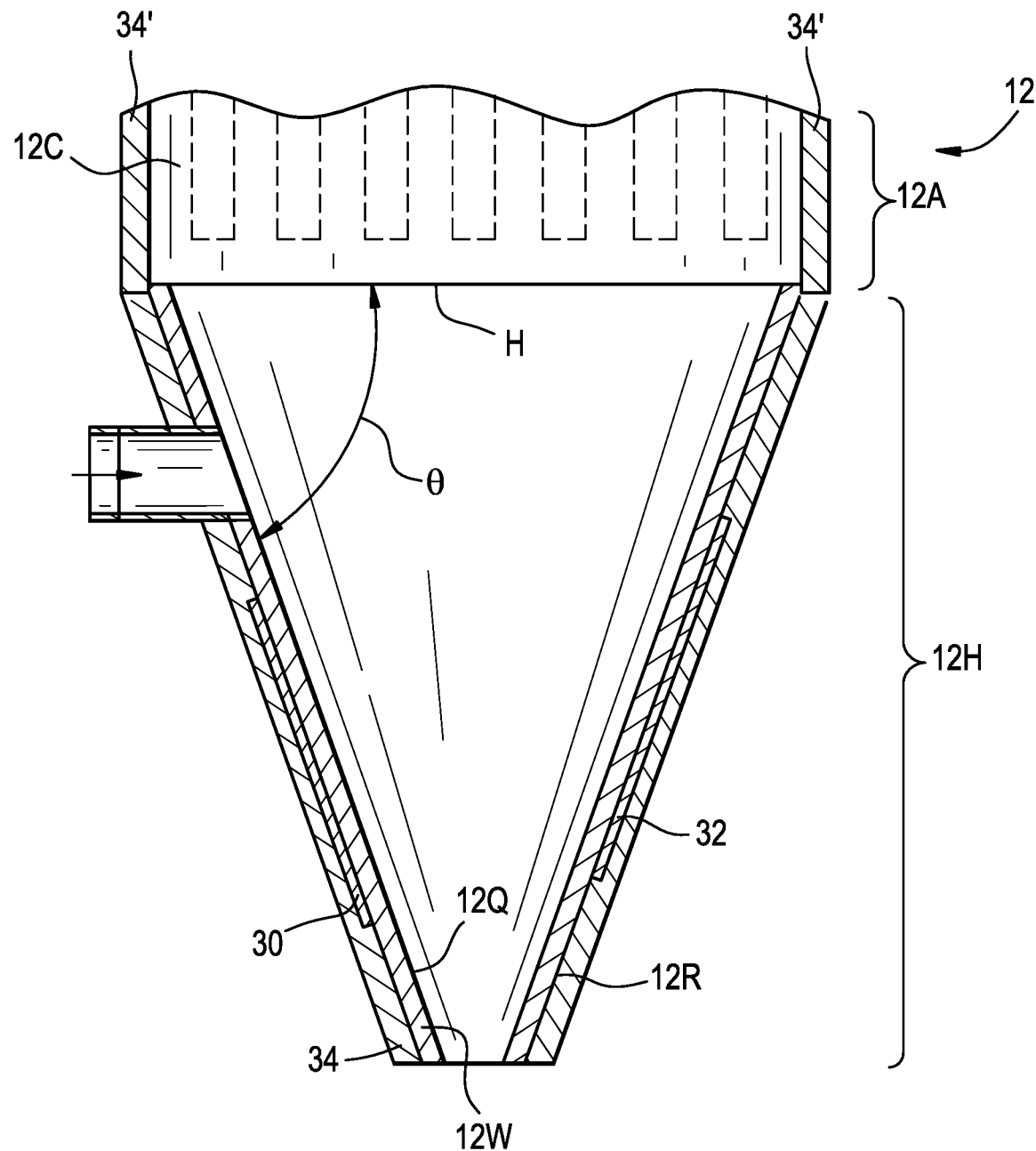
FIG. 3 is an enlarged cross sectional view of a portion of the conditioning system of FIG. 2B.

As shown in FIG. 3, the holding chamber 12H is defined by a sloped wall 12W that has an inwardly facing surface 12Q and an outward facing surface 12R. While the holding chamber 12H is shown and described as having the sloped wall 12W, the present invention is not limited in this regard as other sloped configurations may be employed such as but not limited to an arcuate shaped wall.

As shown in FIG. 3, the inwardly facing surface 12Q of the sloped wall 12W of the holding chamber 12H slopes downwardly from a top portion (i.e., at horizontal reference line H) thereof at an angle θ of a minimum of 60 degrees measured from the horizontal reference line H (i.e., located at the top portion of the sloped wall 12W) to the inwardly facing surface 12Q. In one embodiment, the angle θ is about 70 degrees. The angle θ is selected to promote downward flow of the stucco particulate material in the holding chamber 12H and to prevent: (a) the stucco material from adhering to the sloped wall 12W; (b) bridging of the stucco particulate material between opposing sides of the sloped wall 12W; and (c) blocking of flow of the stucco particulate material out of the holding chamber 12H.

As shown in FIG. 3, a heater system 30 (e.g., a bank of electrical resistance heaters) is in communication with the sloped wall 12W. For example, the heater system 30 is attached to the outward facing surface 12R. The conical wall 12W has a layer of insulation 34 secured thereto. As shown, in FIG. 3 the insulation 34 covers the heater system 30 and further insulation 34' covers the separation chamber 12A. The heater system 30 and the insulation 34, 34' help to prevent condensation in the vessel 12.

Figure 5:
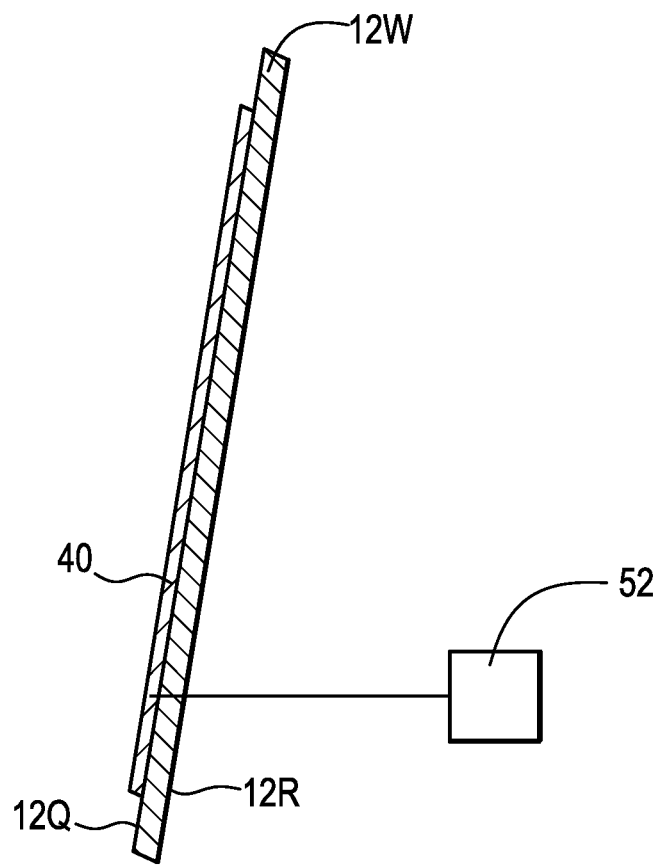
FIG. 5 is an enlarged view of a portion of the sloped wall of the conditioning system of FIG. 2B shown with an air pad on a wall of the conditioning system.
Figure 6:
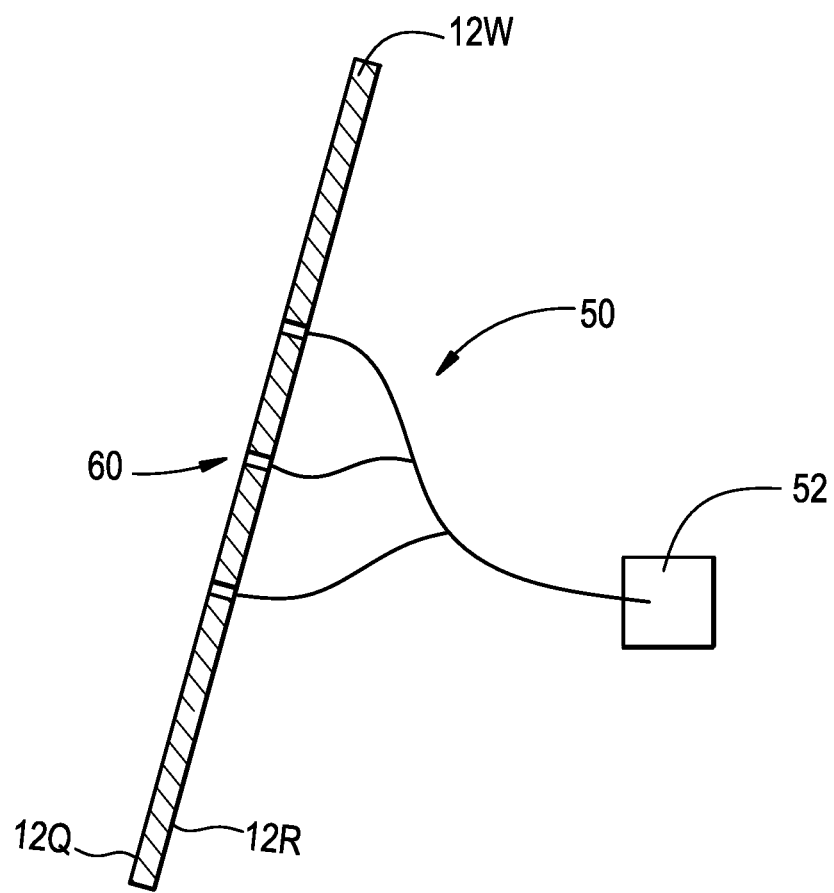
FIG. 6 is an enlarged view of a portion of the sloped wall of the conditioning system of FIG. 2B shown with an air agitation configuration on a wall of the conditioning system.

In some embodiments, the holding chamber 12H includes one or more agitators for mixing and mitigating bridging of the stucco particulate material in the holding chamber 12H. The agitators help release water vapor from the stucco particulate material and also expose over calcined stucco to water vapor which assists in the conditioning process. As shown in FIG. 3, a vibrator arrangement 32 agitator is secured to the outwardly facing surface 12R. As shown in FIG. 5 a gas distribution arrangement 50 agitator is secured to the inwardly facing surface 12Q to assist in promoting the downward flow of the stucco particulate material in the holding chamber 12H. In one embodiment, the gas distribution arrangement 50 includes a configuration of porous pads that are supplied with pressurized and heated air from an air supply system 52. As shown in FIG. 6, another embodiment of the gas distribution arrangement 50 is secured to the inwardly facing surface 12Q to assist in promoting the downward flow of the stucco particulate material in the holding chamber 12H. In one embodiment, the gas distribution arrangement 50 includes a configuration of nozzles 60 that are supplied with pressurized and heated air from an air supply system 62. As shown in FIG. 2B, the conveyor 16 includes a screw 16A with helical flights 16F (e.g., variable pitch flights see FIGS. 7A and 7B) that serve as the agitator to churn the particulate material, to prevent the stucco particulate material from bridging in the holding chamber 12H and to assist in promoting uniform flow of the stucco particulate material out of the holding chamber 12H.

Figure 7A:
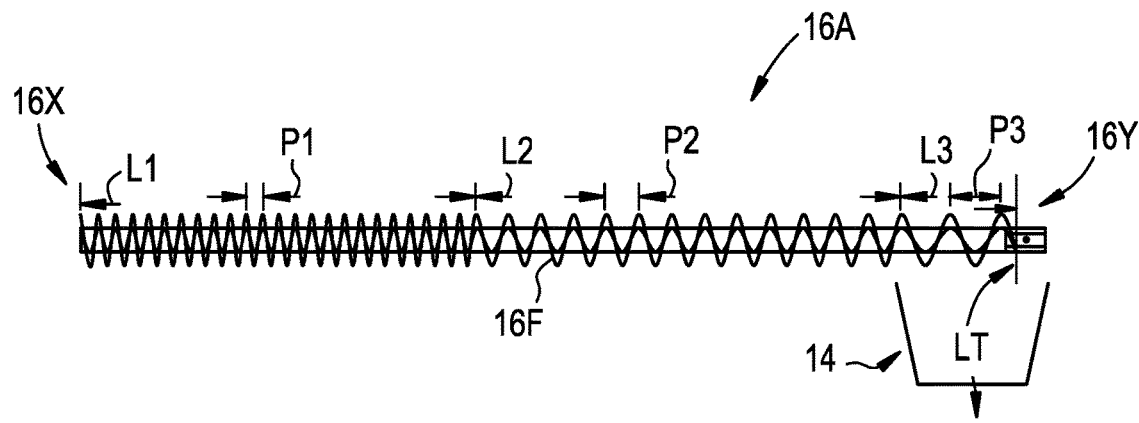
FIG. 7A is a schematic diagram of a variable pitch conveyor screw.

In one embodiment, as shown in FIG. 7A the screw 16A is a variable pitch screw that has a non-uniform geometry configured to agitate, churn and convey the stucco particulate material at decreasing rates along a length LT of the screw 16A from a first end 16X to a second end 16Y thereof and to discharge the stucco particulate material through the stucco outlet 14 on a first-in/first-out basis. For example, the screw 16A has different thread pitches (i.e., distance between threads) along the length LT thereof. The screw 16A has a first pitch P1 along a length L1, a second pitch P2 along a length L2 and a third pitch P3 along a length L3. The third pitch P3 is greater than the second pitch P2 and the second pitch P2 is greater than the first pitch P1. The first length L1 extends axially from the first end 16X in a direction toward the second end 16Y and terminates at a point intermediate the first end 16X and the second end 16Y. The second length L2 extends between the first length L1 and the third length L3. The third length L3 extends axially from the second end 16Y in a direction toward the first end 16X and terminates intermediate the first end 16X and the second end 16Y. The third length L3 is positioned proximate to the stucco outlet 14. As shown in FIG. 7A, the first length L is greater than the second length L2 and the second length is greater than the third length L3. However, the present invention is not limited in this regard, as the first length L1, the second length L2 and the third length L3 may be of equal magnitudes, different magnitudes or other magnitudes configured to selectively control agitation and the conveyance rate of the stucco particulate material along the length LT of the screw 16A and to discharge the stucco particulate material through the stucco outlet 14 on a first-in/first-out basis.

As the screw 16A rotates, a first rate R1 of agitation and conveyance of the stucco particulate material is generated along the first length L1, a second rate R2 of agitation and conveyance of the stucco particulate material is generated along the second length L2 and third rate R3 of agitation and conveyance of the stucco particulate material is generated along the third length L3. The first rate R1 is greater than the second rate R2 and the second rate R2 is greater than the third rate R3. Collectively, the first rate R1, the second rate R2 and the third rate R3 cooperate to cause a uniform discharge of the stucco particulate material out of the holding chamber 12H between a first end 12X and a second end 12Y of the holding chamber 12H and to discharge the stucco particulate material through the stucco outlet 14 on a first-in/first-out basis.

Figure 7B:
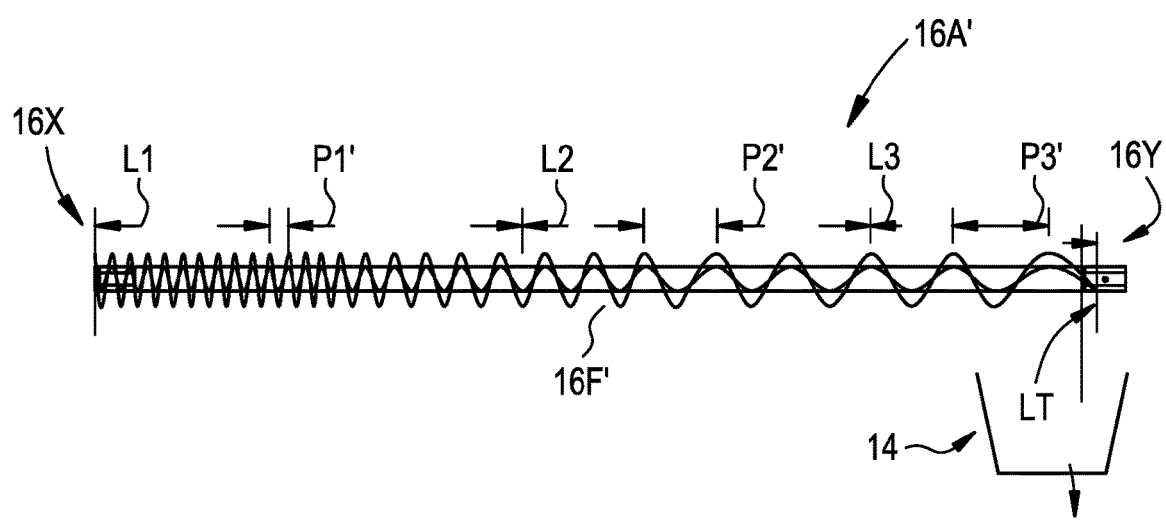
FIG. 7B is a schematic diagram of another embodiment of a variable pitch conveyor screw.

While the screw 16A in FIG. 7A is illustrated having the first length L1, the second length L2 and the third length L3 having the first pitch P1, the second pitch P2 and the third pitch P3, respectively, the present invention is not limited in this regard as the pitch may gradually or progressively increase along the length LT of the screw 16A' from the first end 16X to the second end 16Y, as shown in FIG. 7B.

Figure 4:
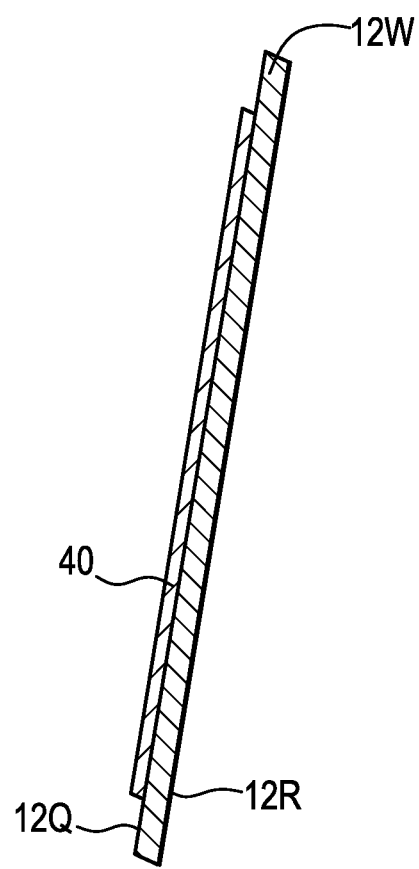
FIG. 4 is an enlarged view of a portion of the sloped wall of the conditioning system of FIG. 2B shown with a low friction liner on a wall of the conditioning system.

As shown in FIG. 4, a liner arrangement 40 (e.g., a liner made from a low friction material) is secured to the inwardly facing surface 12Q to assist in promoting the downward flow of the stucco particulate material in the holding chamber 12H. In one embodiment, the low friction material is polytetrafluoroethylene.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A system for conditioning stucco particulate material, the system comprising:
   a single vessel having separation chamber and a holding chamber, both being located in the vessel, the separation chamber being in direct communication with the holding chamber;
   stucco particulate material entrained in hot air, the stucco particulate material having residual gypsum and over calcined stucco therein;
   the separation chamber having an inlet configured for supplying the stucco particulate material entrained in the hot air, the separation chamber having a collector system configured for separating the stucco particulate material from the hot air, the separation chamber having a hot air outlet for discharging the hot air from the separation chamber, the collector system having a discharge capacity for discharging the stucco particulate material from the separation chamber and into the holding chamber;
   the holding chamber defining a holding volume therein and the holding chamber having a stucco outlet and a conveyor screw disposed between the holding volume and the stucco outlet, the conveyor screw configured for conveying the stucco particulate material through the stucco outlet and for mixing and mitigating bridging of the stucco particulate material in the holding chamber; and:
   (a) the holding volume is of a predetermined magnitude configured to achieve a residence time of 20 to 30 minutes of the stucco particulate material in the holding chamber to thereby condition the stucco particulate material in the holding chamber, before discharging the stucco particulate material through the stucco outlet, wherein the conditioning comprises calcining the residual gypsum into calcium sulfate hemihydrate and transforming the over calcined stucco into calcium sulfate hemihydrate; and
   (b) a control unit in communication with a drive unit connected to the conveyor screw, a sensor in communication with the holding chamber and the control unit, the sensor being a level sensor or level switch and configured to generate control signals at a setpoint, the control signals being indicative of a level of stucco particulate material in the holding chamber and to transmit the control signals to the control unit, the control unit being configured to control the drive unit based upon the control signals, to accumulate and retain the stucco particulate material in the holding chamber, the control unit being configured to achieve the residence time of 20 to 30 minutes of the stucco particulate material in the holding chamber before discharging the stucco particulate material through the stucco outlet.

2. The system of claim 1 further comprising a stucco cooler positioned downstream of and in communication with the stucco outlet and a moisture supply in communication with the stucco cooler to supply moisture to the stucco cooler for transforming the over calcined stucco into the calcium sulfate hemihydrate in the stucco cooler.

3. The system of claim 1, wherein the vessel comprises at least one of a heater and insulation to prevent condensation in the vessel.

4. The system of claim 1, wherein the holding chamber comprises an agitator for mixing and mitigating bridging of the stucco particulate material in the holding chamber.

5. The system of claim 4, wherein the agitator comprises at least one of:
(a) a vibrator arrangement;
(b) a gas distribution arrangement; and
(c) a variable pitch flight of the conveyor screw.

6. The system of claim 1, wherein the holding chamber comprises a sloped wall that has an inwardly facing surface that slopes downwardly from a top portion thereof at an angle of a minimum of 60 degrees measured from a horizonal reference line at the top portion to the inwardly facing surface.

7. The system of claim 6, wherein the angle is about 70 degrees.

8. The system of claim 1, wherein the holding chamber comprises a liner arrangement therein, the liner arrangement comprising a low friction material.

9. The system of claim 8, wherein the low friction material comprises polytetrafluoroethylene.

10. The system of claim 1, wherein the holding chamber has a maximum capacity level, the setpoint is set at the maximum capacity level and the control unit is configured to reduce speed of the drive unit to reduce output of the conveyor screw, until the maximum capacity level is reached.

11. The system of claim 10, wherein the control unit is configured to maintain the drive unit at a minimum speed configured to prevent bridging or caking of the stucco particulate material.

12. The system of claim 1, further comprising a support structure engaging the holding chamber to support the weight of the holding chamber and the weight of the stucco particulate material accumulated and retained therein.

13. The system of claim 1, wherein the conveyor screw has a first end and a second end, the second end being located proximate the stucco outlet, the conveyor screw having at least a first pitch and a second pitch, the second pitch being proximate the second end and the second pitch being greater than the first pitch, configured to serve as an agitator to churn the stucco particulate material, to prevent the stucco particulate material from bridging in the holding chamber and to assist in promoting uniform flow of the stucco particulate material out of the holding chamber.

\* \* \* \* \*